(No Model.)
F. B. RAY.
COMBINED BELT GUIDE AND REEL FOR THRASHING MACHINES, &c.
No. 311,364. Patented Jan. 27, 1885.
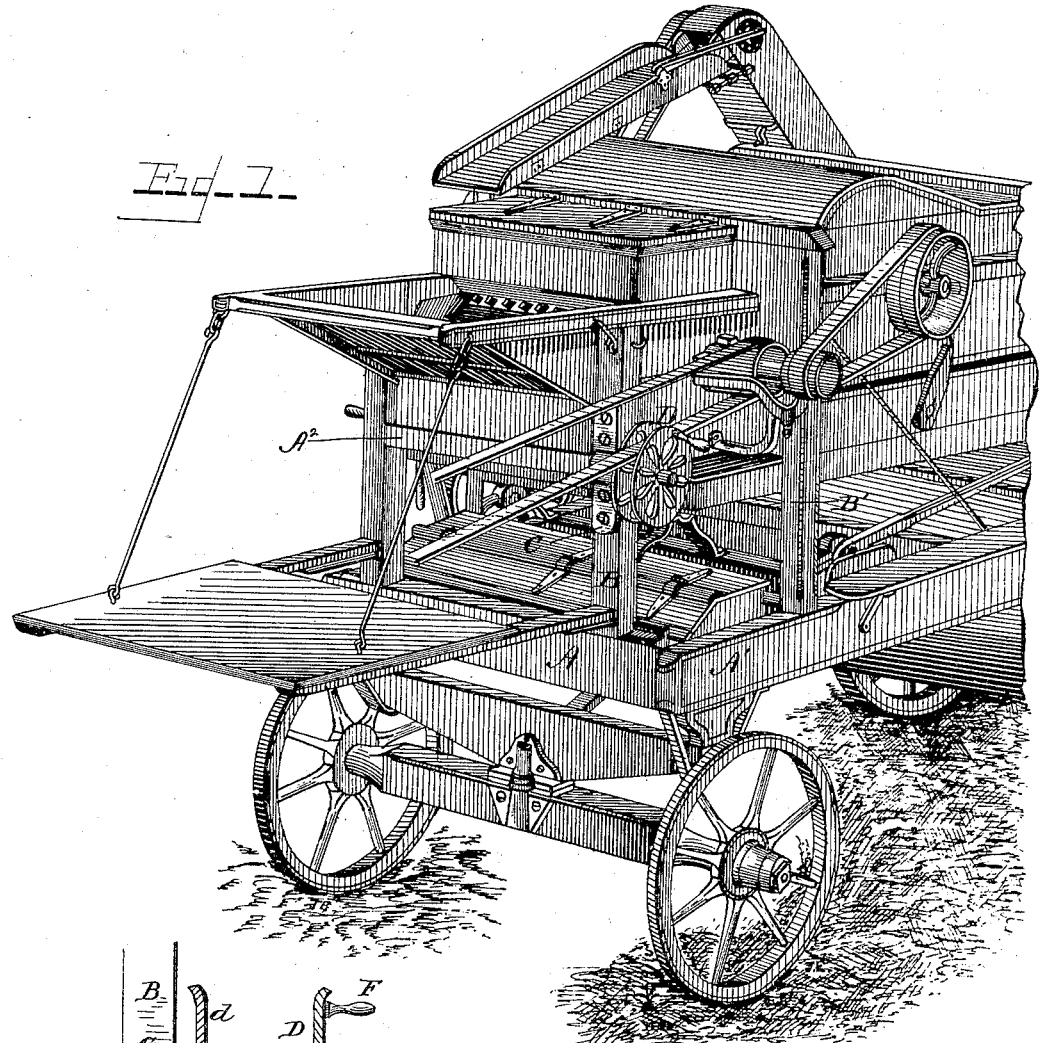
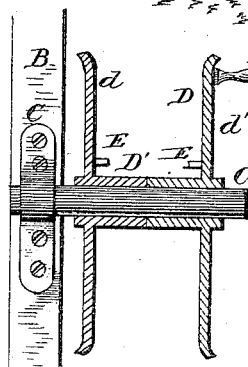
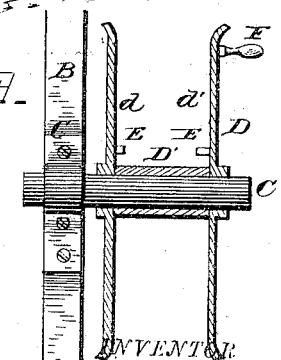
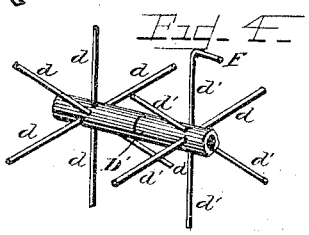
WITNESSES
F. L. Ouraud.
G. S. Elliott
INVENTOR
Frank B. Ray
by Alex Mahon
Attorney

UNITED STATES PATENT OFFICE.

FRANK B. RAY, OF KANSAS CITY, MISSOURI.

COMBINED BELT GUIDE AND REEL FOR THRASHING-MACHINES, &c.

SPECIFICATION forming part of Letters Patent No. 311,364, dated January 27, 1885.

Application filed December 22, 1884. (No model.)

*To all whom it may concern:*

Be it known that I, FRANK B. RAY, of Kansas City, county of Jackson, State of Missouri, have invented certain new and useful Improvements in Combined Belt Guide and Reel for Thrashing-Machines and Like Power-Driven Machinery, of which the following is a full and exact description, reference being had to the accompanying drawings, making part of this specification, in which—

Figure 1 is a perspective view of a portion of a thrashing-machine, showing my improvement applied. Fig. 2 is a front view of the same, and Figs. 3 and 4 show modifications in the form of the belt guide and reel.

With driving-belts of thrashing-machines, corn-shellers, and like power-driven machinery great difficulty and inconvenience have been experienced on account of the edges of the belt becoming rapidly worn away, especially where the machine was operated in heavy winds and some distance from the power, and in properly guiding the belt to the band-wheel, and also in winding and transporting said belt from place to place; and the object of my invention is to combine in one device a means for overcoming and remedying said difficulties; and to this end my invention consists in the combination, with a suitable frame and band-wheel, of a combined belt guide and reel arranged on said frame to form both a reel on which to wind the belt and as a guide for the belt when in use.

It further consists in providing the combined belt guide and reel with a handle for adapting the same for use as a reel on which to wind the belt.

It further consists in providing the rims, flanges, or disks of the combined belt guide and reel with spurs projecting from their inner faces to engage the belt in winding up the same.

It further consists in a novel construction of combined belt guide and reel, whereby either of the sides or disks which guide the belt may revolve upon the journal independently of the other, all as hereinafter explained.

In the accompanying drawings I have illustrated my invention as applied to thrashing-machines, in which drawings A A' A² represent portions of the transverse and longitudinal frame-timbers of the machine, and B B' the upright side timbers adjacent to the concave and thrashing-cylinder, and upon the projecting shaft of which cylinder is mounted the band-wheel or driven pulley of the machine, and from which motion is communicated to the other parts thereof. This pulley is located near to the upright timber B', and may be constructed in any usual or preferred way.

To the front upright timber, B, or to said timber B and the transverse timber A², is secured a bracket, C, made in any suitable form, and which forms a support or bearing for a shaft or journal, C', which projects therefrom parallel with the driven pulley or band-wheel, but below the plane thereof, for a purpose hereinafter explained, and upon which shaft is mounted a reel and guiding-pulley, D. This reel or guiding-pulley is preferably composed of a hub, D', having rims or flanges formed upon each end thereof, between which the belt is run, either when said device is used to guide the belt, or as a spool or reel on which to wind said belt, and is also preferably made in two parts, d d', either by dividing the hub centrally of its length, as shown in Fig. 2, or by placing two disks at the ends of the hub, as shown in Fig. 3, so that the rims, flanges, or disks may revolve on the shaft or journal C' independently of each other when the device is used as a guiding-pulley and the belt is brought into contact with either of said rims, flanges, or disks, and thereby lessen the friction and prevent the wear on the edges of the belt. This reel or guiding-pulley, instead of having the rims, flanges, or disks to hold the belt in place or guide the same to the pulley, may be composed of a series of separate spokes secured in the hub in any preferred way; but such modifications in the device will be apparent without further description.

To connect the belt to the device when it is used as a reel or spool on which to wind the belt, projecting lugs or ears E are formed upon the inner faces of the rims, flanges, or disks, as shown in Fig. 2, said belt being connected therewith by passing the same under said lugs and forming a loop, and which will cause both the rims to turn together. A suitable handle, F, is secured to the outer rim, flange, or disk, to revolve the same in winding the belt thereon.

The reel or guide-pulley, as before stated, is shown as arranged below the plane of the band or driven pulley, so that only the lower section of the belt shall move between the rims or flanges in being guided to the band or driven pulley, as such arrangement has in practice been found most desirable on thrashing-machines; but where the reel and guide is used on other classes of machinery where the belt is run in an opposite direction, the reel and guide will be arranged above the plane of the band or driven pulley, and in such position as to engage the upper section of belt.

I have described the reel or guide-pulley as being made divided; but the same may, if found desirable, be made of a single piece.

Having now described my invention, I claim—

1. The combination, with a suitable frame and a band-wheel, of a combined belt guide and reel arranged on the frame and adapted to form both a reel on which to wind the belt and a guide for the belt when in use, substantially as described.

2. A combined belt guide and reel provided with a handle for adapting the device for use as a reel on which to wind the belt, substantially as described.

3. A combined belt guide and reel provided with rims, flanges, or disks having spurs formed upon the inner faces thereof for engaging the belt in winding up the same, substantially as described.

4. A combined belt guide and reel consisting of a journal and independent disks adapted to revolve independently of each other, substantially as and for the purpose set forth.

FRANK B. RAY.

Witnesses:
W. A. KEITH,
W. W. CURRY.